Figure 1:
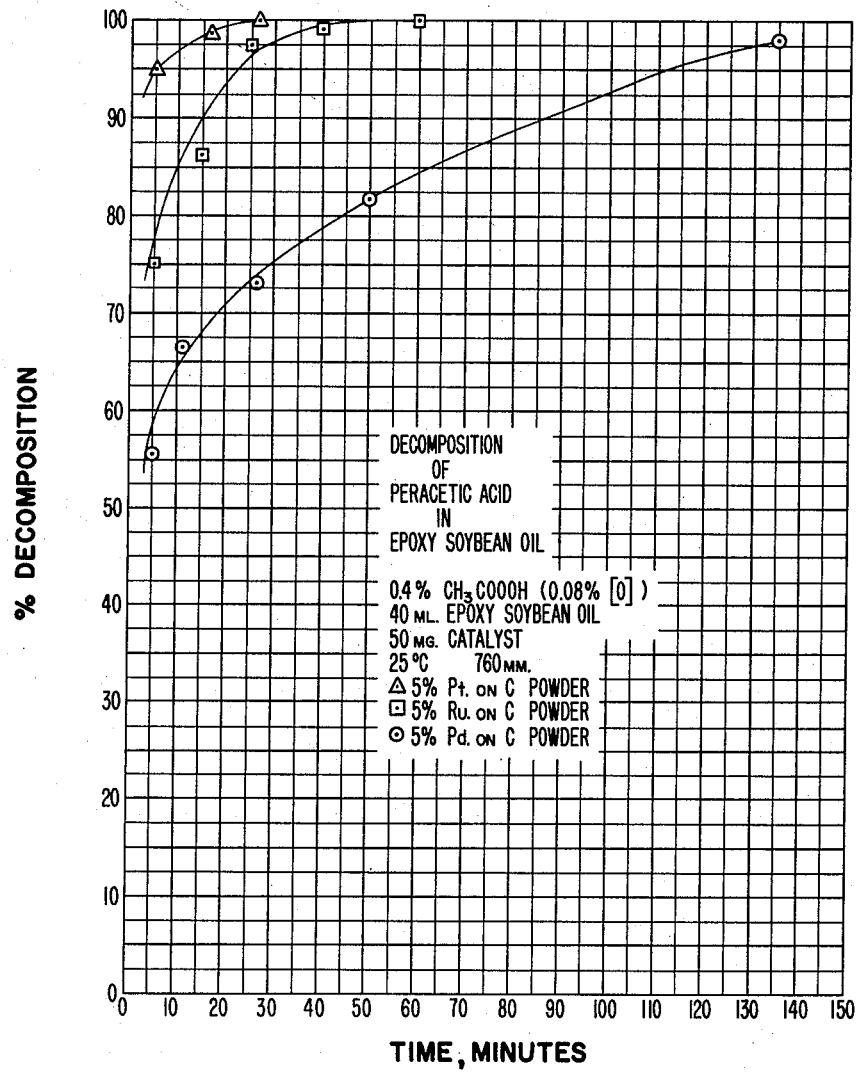

3,146,243
DECOMPOSITION OF PERACETIC ACID WITH PLATINUM OR RUTHENIUM CATALYST ON A CARBON POWDER

Holger C. Andersen, Morristown, and Philip L. Romeo, Sr., Old Bridge, N.J., assignors to Engelhard Industries, Inc., Newark, N.J., a corporation of Delaware
Filed Sept. 22, 1961, Ser. No. 139,923
6 Claims. (Cl. 260—348.5)

This invention relates to the catalytic decomposition of peroxides in acid solutions and more particularly to the removal of organic peroxy acids in liquid media. The invention is also applicable to the catalytic decomposition of hydrogen peroxide in the presence of organic peroxy acids when such peroxides are present as contaminants in liquid media.

The use of peroxides, such as organic peroxy acids, as oxidizing agents is well known. Many reactions of commercial interest utilizing these compounds have been recorded in the literature. Various unsaturated fatty oils are epoxidized with such organic peroxy acids. One of the leading uses of peracetic acid is in the preparation of epoxy compounds from unsaturated materials, e.g., plasticizers from soybean oil or tall oil. In order to insure complete epoxidation, a molar excess of the peracetic acid, or acetic acid and hydrogen peroxide, is normally added and removal of the unreacted peroxides from the resultant reaction products presents a problem. For example, reaction products should never be recovered from final reaction mixtures by distillation until all residual peroxides have been destroyed.

The hazardous characteristics of hydrogen peroxide and peroxy acids are well known. Peroxides are explosive in various solutions and elevated temperatures increase the danger. Further, hydrogen peroxide and peroxy acids have irritating and corrosive effects on the eyes, skin and nasal passages. Because of these hazards, special precautions must be taken in storage, handling and purification of materials containing such peroxides.

In accordance with the present invention, a process is provided for the catalytic decomposition of organic peroxy acids in solution, and hydrogen peroxide in the presence of organic peroxy acids, particularly when such peroxides are present as contaminants.

Studies of the decomposition of hydrogen peroxide have been reported and the use of catalysts to accelerate decomposition is known. It is also known that ruthenium has a catalytic activity for the decomposition of concentrated hydrogen peroxide far in excess of that of any other platinum group metals. Little is known of the effect of platinum group metals on the decomposition of organic peroxy acids. While there is some evidence that platinum black decomposes peracetic acid, the rate of decomposition is very slow.

In the absence of a catalyst, the decomposition of residual peroxides has been observed to be extremely slow. It is known that the pH, the nature of the anion, the concentration of the peroxide and the nature of any solvent used have a marked effect on the activity of catalysts in the decomposition of peroxides. The presence of an acid decreases the catalytic activity of platinum for the decomposition of hydrogen peroxide and the capacity of ruthenium to decompose hydrogen peroxide decreases as the concentration of peroxide decreases. If an oil is present, the oil may coat the surface of the catalyst thereby adversely affecting the catalytic activity.

Further, nickel exerts no catalytic effect on the decomposition of hydrogen peroxide in acid solutions. Although heavy metal ions such as $Fe^{++}$, $Mn^{+++}$, and $Cu^{++}$ are known to promote the decomposition of hydrogen peroxide and peroxy acids, the difficulty of separating out soluble catalysts after reaction is a disadvantage. A further disadvantage is that in some cases the heavy metal ions may initiate unwanted chain reactions in autoxidizable materials.

In accordance with the present invention it has been found that platinum group metal catalysts can be used effectively for the decomposition of organic peroxy acids, and of hydrogen peroxide in the presence of organic peroxy acids and that the process of the present invention can be used effectively for the removal of such peroxides when they are present in liquid media as contaminants. The reaction proceeds more rapidly when the reaction mixture is agitated together with the catalyst.

Peroxy acids and hydrogen peroxide are used as oxidizing agents in many reactions of commercial interest and such peroxides may be present as residual contaminants as a result of reactions such as the epoxidation of unsaturated compounds, the hydroxylation of unsaturated compounds, the oxidation of organic sulfur compounds, organic nitrogen compounds, aldehydes, ketones, and quinones, the ring splitting action on substituted aromatic compounds and the formula of metal salts.

Unlike the catalytic decomposition of hydrogen peroxide where ruthenium has been found to be the most active catalyst, the most effective catalyst of the platinum group metals for promoting the decomposition of organic peroxy acids, and hydrogen peroxide in the presence of organic peroxy acids, in both aqueous solution and in organic solution, e.g., in epoxy soybean oil, is platinum. In view of the reported slow decomposition of peracetic acid by platinum black, the high activity of platinum group metal catalysts supported on finely divided carriers, such as carbon for example, is surprising. It has also been found that catalysts supported on powder are more effective than those on pellets or spheres.

The catalyst is one of the platinum group metals, i.e., platinum palladium, ruthenium, rhodium, iridium, and osmium, or mixtures thereof, but platinum is the most efficacious single catalyst for the process of the invention. The catalyst may be supported on any suitable carrier such as carbon, alumina, barium sulfate, asbestos, and kieselguhr, and the support may be in any suitable form such as granules, powders, pellets or spheres. A preferred support is carbon powder and is recommended in a particle size range of preferably 5 to 40 microns. The rate of decomposition of a peroxide depends upon the ratio of metal content of the catalyst to the peroxide treated and the amount of metal used is dictated by the cost and efficiency of the particular reaction.

The catalytically active metal content of the catalyst may be in the range of about 0.1% to 10% by weight of the total catalyst and support and preferably 0.2% to 8% by weight. The reaction rate will generally be proportional to the total amount of active metal, however, as shown in Table III, there is an optimum amount of catalyst that can be used.

When operating the process of the present invention it is advisable to proceed at low temperatures because of the adverse effect of elevated temperatures on the explosive characteristic of peroxides. However, the operable temperature range for the process is a temperatue at which the reaction mixture is liquid, limited only by the stability of any other compound present. The pressure has no inherent effect on completeness of decomposition but affects the rate at which oxygen is evolved.

The invention will be further illustrated by reference to the accompanying FIGURE 1 which is a plot of percentage decomposition of active oxygen against time in minutes for the treatment of epoxy soybean oil, containing 0.4% peracetic acid, with various platinum group metal catalysts.

The invention will be further illustrated by reference to the following specific examples.

Although the experiments were conducted at room temperature and atmospheric pressure, the effects of variations in reaction conditions can be predicted in accordance with well known physical principles, and the particular materials used.

EXAMPLE I

The effect of various catalysts on the rate of decomposition of hydrogen peroxide in acid solution, peracetic acid in water, and peracetic acid in epoxy soybean oil was determined.

The apparatus used consisted of a 500 ml. round bottom flask attached to a 750 ml. gas burette. The water level in the burette was brought to the zero mark. 17.2 mg. of 5% platinum on carbon powder catalyst was added to 40 ml. of 4.6% hydrogen peroxide in dilute HCl (pH about 2). The mixture was agitated at the rate of approximately 250 strokes per minute. The oxygen evolved from the decomposition reaction displaced a volume of liquid in the burette equal to its own volume, and the pressure of the confined gas was brought to atmospheric pressure by adjustment with a leveling tube. The rate of evolution of oxygen was measured at fixed intervals of time.

A series of platinum group metal on carbon powder catalysts and a series of platinum group metals on 1/8" activated aluminum pellets was prepared. Similar tests to that described above were run on hydrogen peroxide in dilute HCl, peracetic acid in water, and peracetic acid in epoxy soybean oil.

The results, tabulated in Table I below, are expressed in specific oxygen evolved in liters oxygen (STP) per minute per gram of metal catalyst. The data on peracetic acid are based on the following analysis of this reagent.

Typical composition, percent by weight:
Peracetic acid, $CH_3COOOH$ _____ percent___ 41.3
Hydrogen peroxide, $H_2O_2$ _____ do____ 5.1
Acetic acid, $CH_3COOH$ _____ do____ 39.3
Sulfuric acid, $H_2SO_4$ _____ do____ 1.0
Water (free) _____ do____ 13.3
Acetyl peroxide _____ do____ 0.0
Others organic materials including peroxides and hydroperoxides _____ do____ 0.0
Stabilizer _____ p.p.m.__ 500

The experiments were conducted at room temperature and atmospheric pressure and the results are as follows:

Table 1.—Decomposition of Hydrogen Peroxide and Peracetic Acid $H_2O_2$: 4.6% by weight; 40 ml. per run.
$CH_3COOOH$: 1 volume to 9 volumes $H_2O$; 85 ml. per run.
　　　　　　1 volume to 9 volumes epoxy soybean oil; 40 ml. per run.
Catalysts: 17.2 mg. of 5% catalyst metal on carbon powder per run.
　　　　　166 mg. of 0.5% catalyst metal on 1/8" activated $Al_2O_3$ pellets per run.
　　　　　1.05 grams of 10% Ag on $AgNO_3$ spheres.

SPECIFIC OXYGEN EVOLUTION, LITERS (STP) PER MINUTE PER GRAM CATALYST METAL

| Catalyst | Hydrogen Peroxide in dil. HCl | Peracetic Acid | |
|---|---|---|---|
| | | 4% peracetic [1] acid in water | Peracetic Acid in Epoxy Soybean Oil [4] |
| 5% Pt carbon powder | 45 | 154 | [2] 64 |
| 5% Ru carbon powder | 157 | 141 | [3] 42 |
| 5% Pd/carbon powder | 14 | 36 | |
| 5% Rh/carbon powder | 14 | 16 | |
| 0.5% Pt/$Al_2O_3$ pellets | 10 | 10 | |
| 0.5% Ru/$Al_2O_3$ pellets | 12 | 7 | |
| 0.5% Pd/$Al_2O_3$ pellets | 7 | 3 | |
| 0.5% Rh/$Al_2O_3$ pellets | 4 | 9 | |
| 10% Ag/spheres | 0.26 | 0.06 | |

[1] 1 volume peracetic acid (40%) to 9 volumes $H_2O$.
[2] 34.4 mg. of 5% Pt on carbon powder used.
[3] Average based on 4 runs using various amounts of catalyst.
[4] 1 volume peracetic acid (40%) to 9 volumes epoxy soybean oil.

The data in Table 1 indicate that platinum group metal catalysts are effective in promoting the decomposition of hydrogen peroxide in acid solution, peracetic acid in acqueous solution, peracetic acid in epoxy soybean oil, and hydrogen peroxide in the presence of peracetic acid in such solutions. Unlike hydrogen peroxide for which ruthenium is shown to be the most active catalyst, the most effective catalyst for the decomposition of peracetic acid solutions is platinum. The data also show that powder-supported catalysts are more effective than catalysts supported on pellets.

EXAMPLE II 50 mg. of 5% platinum on carbon powder catalyst were added to 40 ml. of 0.4% peracetic acid in epoxy soybean oil and the mixture was mechanically agitated. At measured time intervals, 2 ml. samples were withdrawn from the reactor and analyzed by reacting the undecomposed peracid with potassium iodide, and performing a standard iodometric analysis. The experiment was repeated using 50 ml. of 5% ruthenium on carbon powder and 50 mg. of 5% palladium on carbon powder catalyst. The percentage decomposition of active oxygen in solution is plotted against time in minutes in FIGURE 1 of the drawings.

It is evident from the graphs in FIGURE 1 of the drawings that platinum group metal catalysts are effective in removing active oxygen from solution. The 5% platinum on carbon powder catalyst was the most active catalyst while the 5% ruthenium on carbon powder catalyst, although not as good as platinum, still showed high activity. The 5% palladium on carbon powder catalyst did not remove all the peracid after 135 minutes.

EXAMPLE III

Following the procedure outlined in Example I above, 4.3 mg. of 5% ruthenium on carbon powder catalyst were added to 40 ml. of 4% peracetic acid in epoxy soybean oil and the rate of oxygen evolution was measured as in Example I above. Similarly, 8.4 mg., 17.2 mg. and 34.4 mg. of 5% ruthenium on carbon powder were used. The results are given in Table II.

Table II.—Decomposition of $CH_3COOOH$ in Epoxy Soybean Ooil

[1 volume 40% $CH_3COOOH$ to 9 volumes expoxy soybean oil, 40 ml. per run]

| Catalyst (mg. of Ru on carbon powder) | Volume of $O_2$ evolved in ml. (first minute) | Specific $O_2$ rate at STP in liters/ min./gram metal |
|---|---|---|
| 4.3 | 10 | 43.0 |
| 8.4 | 25 | 54.0 |
| 17.2 | 34 | 36.6 |
| 34.4 | 61 | 32.6 |

The data in Table II indicate that the rate of decomposition of peracetic acid in epoxy soybean oil varies with the metal content in the reaction mixture. The data also indicate that there is an optimum amount of catalyst that may be used since at 8.4 mg. of catalyst, the specific rate is greater than where 4.3 mg. or 17.2 mg. of catalyst are used.

It will be obvious to those skilled in the art that many modifications may be made within the scope of the present invention without departing from the spirit thereof, and the invention includes all such modifications.

What is claimed is:

1. A process for the catalytic decomposition of peracetic acid which process consists of contacting peracetic acid in the liquid phase with a solid catalyst consisting essentially of a metal selected from the group consisting of platinum and ruthenium, said metal being supported on carbon powder, and the metal being present in an amount between 0.1% and 10% by weight of total catalyst.

2. The process of claim 1 wherein the peracetic acid is in aqueous medium.

3. The process of claim 1 wherein the peracetic acid is dissolved in epoxy soybean oil.

4. The process of claim 1 wherein the carbon powder has a particle size range of from 5 to 40 microns.

5. The process of claim 1 wherein the catalytic metal is platinum.

6. The process of claim 1 wherein the catalytic metal is ruthenium.

References Cited in the file of this patent

UNITED STATES PATENTS 2,873,283     Yang _____ Feb. 10, 1959

OTHER REFERENCES

Berezovskaya et al.: J. Phys. Chem. (U.S.S.R.), 7, 939–51 (1936); cf. Chem. Abs. 31:6957[4], 1937, QD. 1–A–51.

Hasegawa: Rev. Phys. Chem. (Japan), vol. 1946, 21–30; cf. Chem. Abs. 44:4319e, 1950; QD. 1–A–51.

Foley et al.: Can. J. Chem., 29, 895–903 (1951); cf. Chem. Abs., 46:3385g, 1952; QD. 1–A–51.

Krause: Przemysl Chem., 29, 277–83 (1950); cf. Chem. Abs., 46:6916e, 1952; QD. 1–A–51.

Lopatukhina et al.: Izvest. Akad. Nauk Kazalch. (U.S.S.R.), No. 101, Ser. Khim., No. 4, 60–4 (1951); cf. Chem. Abs. 48:3170i, 1954; QD. 1–A–51.

Lopatkin et al.: Zhur. Fiz. Khim. 31, 195–9 (1957); cf. Chem. Abs. 51:17283g, 1957; QD. 1–A–51.